United States Patent [19]

Reimann

[11] 4,134,272

[45] Jan. 16, 1979

[54] PROTECTION CIRCUIT FOR A DUAL SOURCE REFRIGERATION UNIT

[75] Inventor: Robert C. Reimann, Syracuse, N.Y.

[73] Assignee: Carrier Corporation, Syracuse, N.Y.

[21] Appl. No.: 803,088

[22] Filed: Jun. 3, 1977

[51] Int. Cl.² ............................................. F25B 49/00
[52] U.S. Cl. ........................................ 62/115; 62/228
[58] Field of Search ................. 62/230, 236, 115, 228; 307/68; 361/92

[56] References Cited

U.S. PATENT DOCUMENTS

| 2,740,904 | 4/1956 | Goss | 62/236 X |
| 2,907,182 | 10/1959 | Kuklinski | 62/236 X |
| 3,043,115 | 7/1962 | Harter | 62/236 |
| 3,335,325 | 8/1967 | Elpers | 361/92 |

Primary Examiner—William E. Wayner

Attorney, Agent, or Firm—J. Raymond Curtin; Robert P. Hayter

[57] ABSTRACT

Apparatus and a method for providing an electrical circuit to protect the internal components of a dual source combination motor-generator refrigeration unit having an internal power source and an external power source. The circuit is comprised of switching apparatus, a voltage sensitive relay, a high pressure switch, a time delay relay, an electrically operated clutch, a speed control solenoid and other electrical components to protect the engine, motor-generator, vapor compression refrigeration system and the electrical components sensitive to voltage fluctuations from various malfunctions including loss of engine speed, high refrigerant pressure, voltage fluctuations and operation of the compressor in an improper mode.

14 Claims, 3 Drawing Figures

PROTECTION CIRCUIT FOR A DUAL SOURCE REFRIGERATION UNIT

BACKGROUND OF THE INVENTION

1. Field of Invention

The present invention relates to dual source refrigeration units. As used in this application "dual source" shall refer to those units which are adapted to alternatively receive electrical power from either an external power source such as a wall receptacle or from a self contained generator. More specifically, the present invention relates to a protective circuit within a combination motor-generator unit which provides for shutdown of the unit as well as malfunction indication under a variety of malfunction situations. As used herein a "combination motor-generator" shall refer to a device which is capable of generating electricity when connected to a prime mover and also capable of acting as a prime mover when connected to an electrical power source.

2. Description of the Prior Art

Refrigeration units used in the trucking industry for cooling trailers or containers must be capable of dual source operation. This type of apparatus usually has an internal power source, such as a gasoline engine, for operation while on the road or away from the shipping dock and it is further adapted to receive electrical power from an external source such as an electrical receptacle while at the shipping dock. Some units have a gasoline engine mechanically connected through a clutch to both a compressor in the refrigeration system and to an electricity generator. Through these connections the engine drives the compressor to power the refrigeration system and simultaneously drives the generator to generate electrical power for the various electrical components of the unit. A separate electric motor has been provided for driving the compressor at dockside when the unit is electrically connected to the power receptacle.

Advanced refrigeration units now use a combination motor-generator rather than having a motor separate from the generator. When the combination unit is not at dockside, operation is similar to the prior unit with the diesel engine powering both the compressor and the motor-generator, the motor-generator then acting as a generator. At dockside the same motor-generator is operated as an electric motor to drive the compressor to eliminate the need for an additional motor. For examples of this type of combination apparatus and the control circuitry utilized therewith see the U.S. Pat. Nos. granted to Martin et al (3,720,842), Harter (3,043,115), Kuklinski (2,907,182) and Shaw (2,881,376).

In a dual source refrigeration unit having a combination motor-generator it was deemed desirable to develop protective circuitry to assure the integrity of the components should a malfunction occur and to simultaneously provide an operational control circuit. During start up of the unit when it is operated in the internal power source mode it is desirable to have the prime mover achieve its operational speed before the compressor of the refrigeration unit is connected to the prime mover, especially since an induction generator will not build up voltage under load. It is further desirable to discontinue unit operation if as a result of improper prime mover speed or other factors the voltage of the current being generated is not within a predetermined range said improper voltage possibly causing overheating of the electric motors in the unit or resulting in a loss of residual magnetism in the core of the motor-generator. Another desirable protective feature is to disconnect the prime mover if the pressure within the refrigeration system is not within a predetermined range. A separate feature includes disconnecting the compressor from the prime mover when the unit is in an auxiliary mode of operation (auxiliary operation includes the unit being operated to defrost the evaporator or to generate heat to raise the temperature of the load). Furthermore, it is desirable to indicate malfunctions to the operator of the unit. None of the references cited above discloses apparatus or a method for providing the appropriate circuitry to obtain these safety and operational features.

SUMMARY OF THE INVENTION

An object of the present invention is to protect the internal components in a dual source combination motor-generator refrigeration unit.

A more specific object of the present invention is to disengage the motor-generator if the voltage fluctuates from a predetermined range due to a malfunction.

Another object of the present invention is to disengage the compressor from the power source if the refrigeration system pressure becomes excessive or if the engine speed varies.

A further object of the invention is to prevent the operation of the compressor when the refrigeration unit is in an auxiliary mode of operation not requiring the use of the compressor.

Another object of the invention is to provide a simple, reliable and efficient control circuit in a dual source refrigeration unit.

Other objects will be apparent from the description to follow and the appended claims.

The preceding objects are achieved according to a preferred embodiment of the invention by the provision of a plurality of connected electrical and hydraulic components. A voltage relay and a high pressure switch are connected in series to switching apparatus for selecting the proper power relay depending on the power source (the power relay including either the power relay or the speed solenoid). A time delay relay is further connected to enable the power relay to engage for a predetermined time period without the voltage relay being engaged. An electrically operated clutch rotatably connecting the compressor to the motor-generator is connected to disengage the compressor after the time delay period if either the voltage relay is not actuated or if the unit is in an auxiliary mode of operation. Furthermore a malfunction indicator is connected to indicate a malfunction to the operator after the time delay period.

DESCRIPTION OF THE PREFERRED EMBODIMENT

The embodiment of the invention described below is adapted for use with a dual source combination motor-generator refrigeration unit but it is to be understood that the invention has like application for similar uses. A conventional dual source refrigeration unit is adapted to be transportable such as a unit used in a truck trailer or a container. A gasoline engine or similar prime mover is provided to drive a motor-generator and the compressor of the refrigeration system when the unit is not at dockside, the motor-generator then being in the generation mode to produce electrical power for the other electrical components of the unit. While at dockside the unit is adapted to be connected to an external source of power. In this mode of operation the prime mover is disconnected and the motor-generator acts as an electric motor powering the compressor.

Figure 1:
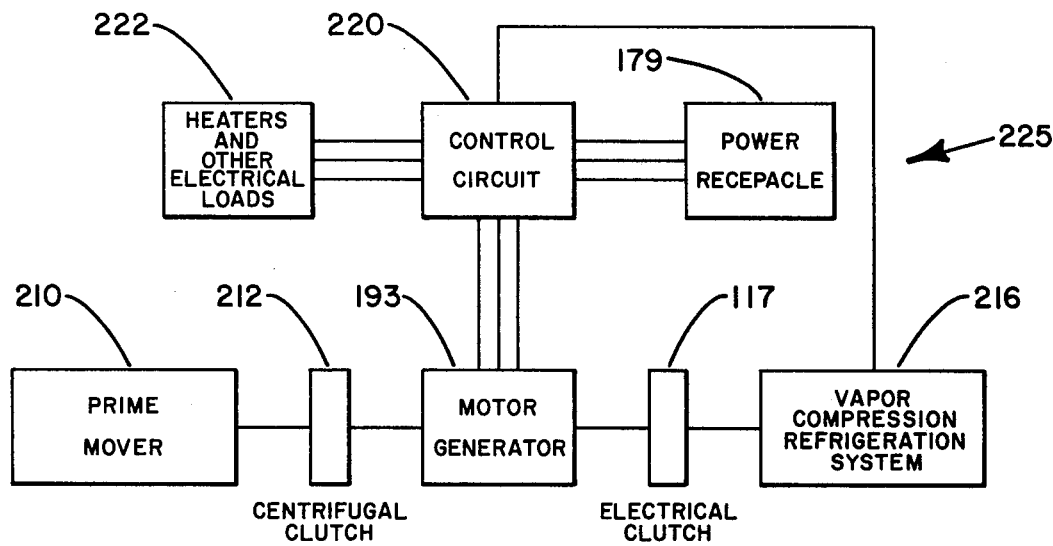
FIG. 1 is a schematic diagram of the principal component of a dual source combination motor-generator refrigeration unit.

Referring now to the drawings, FIG. 1 is a schematic diagram of the principal components of a dual source combination motor-generator refrigeration unit. A prime mover 210, such as a gasoline engine, is provided to power refrigeration unit 225 when the unit is in the mode of operation using the internal power source. Prime mover 210 is connected by centrifugal clutch 212 to standby motor-generator 193. The centrifugal clutch is selected so that the motor-generator will not be engaged to the prime mover when the prime mover is idling. Motor-generator 193 is mechanically connected to a vapor compression refrigeration system 216 by electric clutch 117. More particularly the motor-generator is connected to the compressor of a conventional refrigeration system.

Motor-generator 193 acts as a generator to power the heaters and other electrical load 222 when the unit is in the internal power source mode of operation. Prime mover 210 supplies the mechanical energy necessary to drive both the motor-generator and the compressor.

When the unit is at dockside or in the external power source mode of operation, electric current is received by electrical power receptacle 179 and used to power the heaters and other electrical loads 222 as well as the motor-generator 193. In this mode of operation the motor-generator acts as an electric motor mechanically driving the compressor of the vapor compression refrigeration system.

Figure 3:
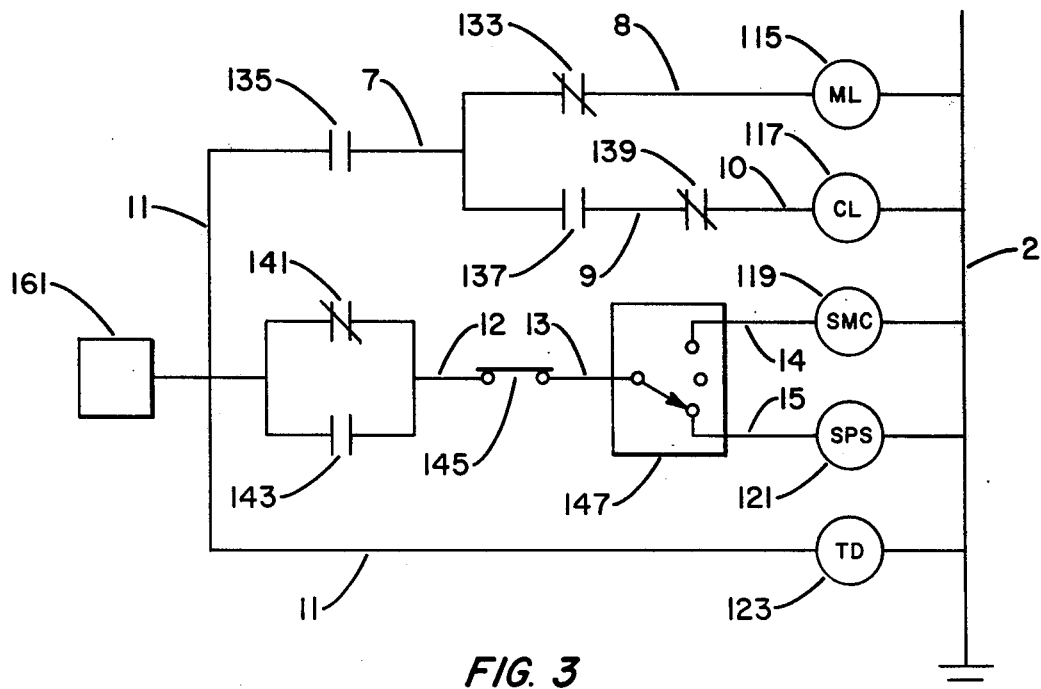
FIG. 3 is an enlarged schematic diagram of a portion of the protective circuit as shown by the dotted lines on the schematic of FIG. 2.
Figure 2:
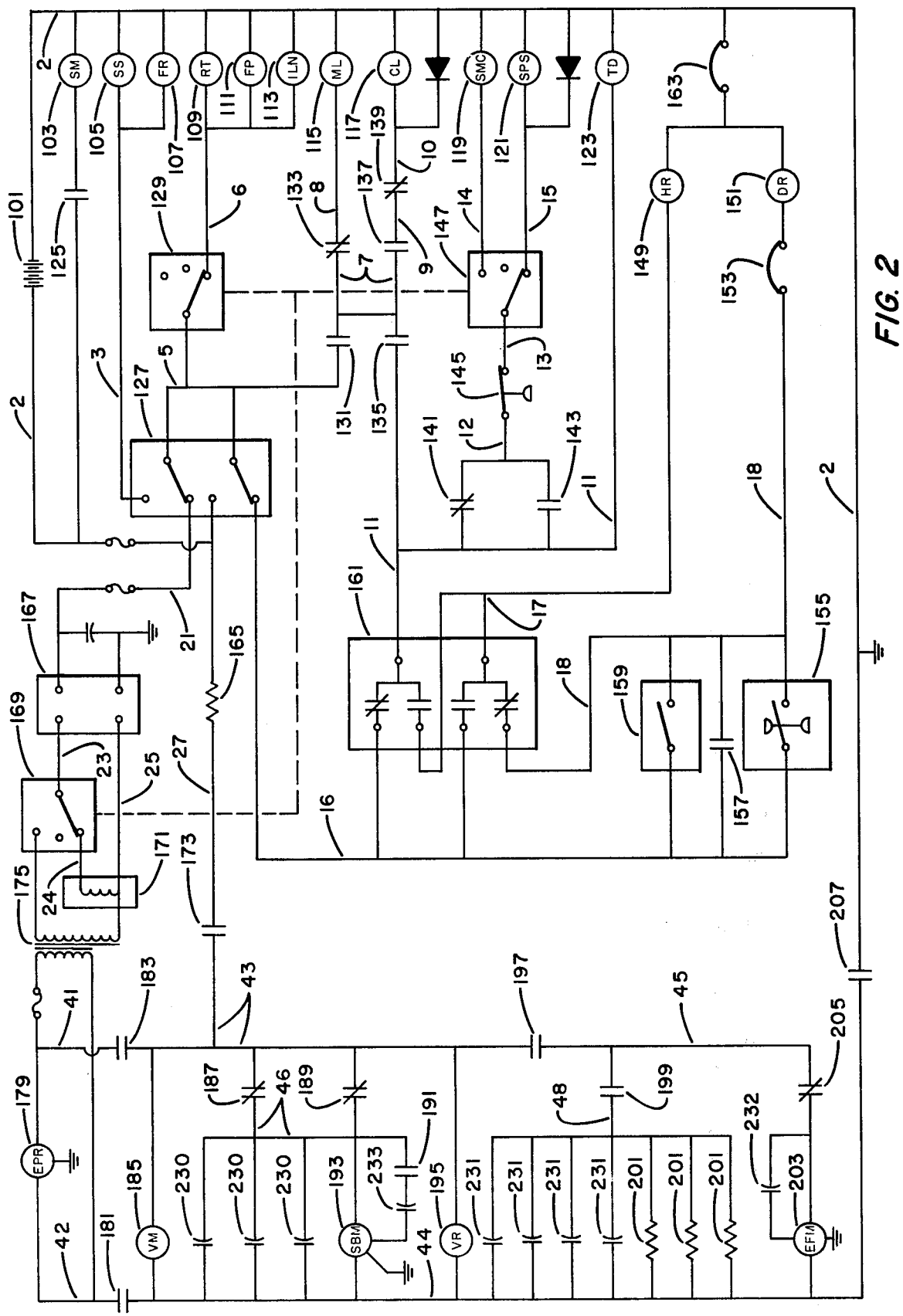
FIG. 2 is a schematic diagram of a single phase electrical circuit for a dual power source refrigeration unit incorporating the protective circuit.

FIG. 2 is a schematic of a single phase diagram of the electrical circuitry of the invention. FIG. 3 is an enlarged portion of FIG. 2. A battery 101 is connected to start switch 127 by wire 1 and to ground by wire 2. Start switch 127 when manually depressed energizes wire 3 activating starter solenoid 105 and flashing relay 107. The starter solenoid when activated closes starter solenoid-1, 125, thereby engaging starter motor 103 to start the gasoline engine. (In this description the coil or other actuating means of any relay will be referred to as the relay and any set of contacts of a particular relay will be referred to as the relay followed by a dash and a number thereby indicating the relay controlling the contacts and the number following the dash referring to the specific set of contacts.)

Flashing relay 107 engages flashing relay-1, 173 and flashing relay-2, 207 during the periods start switch 127 is depressed. The flashing relay contacts are connected in series with resistor 165 allowing current to flow from the battery through wire 1, resister 165, wire 27, flashing relay-1, 173, wire 43, wire 46, the winding of stand-by motor-induction generator 193, wire 44, flashing relay-2, 207, and wire 2 back to the battery. This flashing circuit maintains residual magnetism within the iron core of the induction generator. Without residual magnetism in the core, the excitation capacitors are unable to sufficiently excite the generator to allow buildup of voltage thereby preventing the generator from producing current.

The circuit as shown has three selector switches to differentiate between the two modes of operation, each switch having three positions; off, stand-by power (external power source) and engine power (internal power source). Selector switch-2, 129, is shown in the engine position engaging wire 5 through wire 6 to running time meter 109, fuel pump 111, and ignition 113. Start switch 127 is also shown in the run position wherein it connects wire 5 to wires 21 and 16.

While the engine is running motor-generator 193 is generating current for the power circuit of the unit, the power circuit including the evaporator fan motor 203, heaters 201, voltage relay 195, and volt meter 185, being those components connected among others between wires 43 and 44 and wires 45 and 44. The engine also drives an alternator 171 which is connected to regulator-rectifier 167 and wire 25 by wire 24 through selector switch-3, 169, to wire 23.

The control circuit current during engine operation flows from the regulator-rectifier 167 through an unlabeled fuse, through wire 21 to the start switch 127. Start switch 127 when in the run position provides power through wire 5 to selector switch-2, 129, flashing relay-3, 131, and through wire 16 to temperature control 161, manual defrost switch 159, defrost relay-1, 157, and defrost switch 155.

The temperature control, a conventional thermostat, energizes wire 11 when cooling is called for and wire 17 if heating is necessary. Wire 17 then activates heater relay 149 if heater thermostat 163 is closed. Heater relay 149 then engages heater relay-2, 199 which energizes heaters 201 through wire 48, and disengages heater relay-1, 189 which disengages motor-generator 193 if stand-by motor control relay-3, 187, is also disengaged (when the unit is in the stand-by motor control mode stand-by motor control relay-3, 187 is disengaged). Furthermore, when the unit is in the heat mode of operation, heater relay-3, 139, disengages electrical clutch, 117, preventing the compressor from operation.

When the defrost switch 155, calls for defrost to de-ice the evaporator coil, wire 18 is activated. Wire 18 engages line 17 through the temperature control actuating heater relay 149 assuming the heater thermostat 163 is engaged to complete the circuit. The heater thermostat is designed as an over-temperature protective device and only disengages breaking the circuit when the temperature of the air being controlled exceeds the normal operating temperature by a predetermined amount. Wire 18 also activates defrost relay 151 then closes defrost relay-1, 157 connecting wire 16 to wire 18 until defrost thermostat 153 disengages breaking the current flow to defrost relay 151. Defrost relay-2, 205 disconnects the circuit to evaporator fan motor 203 preventing the fan from operation during a defrost mode. Manual defrost switch 159 is also provided to energize wire 18 from wire 16 to commence the defrost cycle.

In the stand-by mode of operation (external power source) selector switch-1, 147, energizes through wire 14 stand-by motor control 119; selector switch-2, 129, disengages the engine; and selector switch-3, 169, disengages the alternator as a control circuit power source and engages instead transformer 175. Power is supplied from electrical power receptacle 179 to wire 41 and 42 which are connected to wires 43 and 44 by stand-by motor control-1, 181, and stand-by motor control-2, 183. Stand-by motor control-4, 191, connects wire 46 to wire 47 allowing the motor-generator 193 to operate as a motor. When stand by motor control-3, 187, connecting wire 43 to wire 46 is in the open position heating relay-1, 189, is the only current flow path to the motor-generator. Hence, operation as a motor is discontinued as the heater relay is engaged.

Capacitors 230, 231, 232 and 233 are all provided in parallel with standby motor-generator 193. Since the standby motor-generator acts as an induction generator it is necessary to utilize excitation capacitors to allow a buildup of voltage. Since the amount of capacitance required to excite the motor-generator is a function of the load; the circuit capacitors 231 and 232 are mounted in parallel with heaters 201 and evaporator fan motor 203 so that additional capacitance will be available if the heaters or the evaporator fan motor are connected during generator operation. Capacitors 230 also serve to correct the power factor in the unit.

The control circuit of the unit is that segment of the circuit powered from either the alternator or the transformer as well as all relay contacts and the voltage relay. The protective circuit is part of the control circuit and is shown in part enlarged in FIG. 3.

The protective circuit includes time delay relay 123 which is connected to temperature control 161 by wire 11. The temperature control is also connected by wire 11 to voltage relay-1, 143, in the normally open position and in parallel therewith time delay relay-1, 141, in the normally closed position. Wire 12 connects voltage relay-1, 143, and time delay relay-1, 141, to high pressure switch 145 which is in the normally closed position. The high pressure switch is hydraulically connected to the refrigerant system so that when the refrigerant pressure becomes excessive the electrical contacts are open and the circuit is broken.

High pressure switch 145 is connected by wire 13 to selector switch-1, 147. The selector switch has three terminals to which the circuit may be connected, off, external power source and internal power source. Speed control solenoid 121 is connected by wire 15 to the internal power source terminal and stand-by motor control 119 is connected by wire 14 to external power source terminal.

Speed control solenoid 121 is a relay controlling the throttle on a diesel engine or similar motive source acting as a prime mover. The throttle is set so that unless the speed control solenoid is engaged the engine will idle with insufficient rotational speed to engage centrifugal clutch 212. Upon energization of the speed control solenoid the engine speed will be increased and the centrifugal clutch will engage powering the unit. Stand-by motor control 119 is a relay which engages the electric power receptacle 179 to the power circuit through stand-by motor control-1, 181, and stand-by motor control-2, 183. When in the external power source mode of operation the motor-generator 193 cannot be electrically engaged without stand-by motor control 119 being energized.

Temperature control 161, is connected by wire 11 to time delay relay-2, 135, in the normally open position and by wire 7 to voltage relay-2, 137, in the normally open position. Wire 9 connects voltage relay-2, 137, to heater relay-1, 139, which is in the normally closed position. Heater relay-1, 139, is then connected by wire 10 to clutch 117. Also connected by wire 7 to time delay relay-2, 135 is voltage relay-3, 133, in the normally closed position. Connected thereto by wire 8 is malfunction light 115.

During operation when the temperature control calls for cooling a current is passed through time delay relay-1, 141, high pressure switch 145, and selector switch-1 to either the speed control solenoid 121 or stand-by motor control 119. At the same time the current flows through time delay-relay 123. The time delay-relay is preset for a predetermined time interval, for example 10 seconds. After the elapse of the time delay period the positions of the time delay-relay contacts are reversed. Hence after the time delay period current can no longer flow through time delay-relay-1, 141, to the selector switch-1. However, voltage relay-1, 143, is in parallel with time delay-relay-1, 141, and current may flow through voltage relay-1 if the voltage sensed in the power circuit by voltage relay 195 is within a predetermined range. Should the voltage during operation vary from this range or should the power circuit not achieve the proper voltage during the time delay period on startup, then voltage relay-1, 143, will not complete the circuit to the selector switch to operate the refrigeration unit.

The temperature control also energizes the electric clutch 117 to engage the motor-generator to the compressor. Time delay-relay-2, 135, is normally open and prevents the clutch from being engaged prior to the elapse of the time delay period. Voltage relay-2, 137 is normally open and prevents engagement of the electric clutch unless the power circuit voltage is within the proper range. Heater relay-1, 139 in the normally closed position prevents engagement of clutch relay 117 if the unit is in the heat mode during which the compressor should not be operated.

In addition thereto, malfunction light 115 indicates when the unit is not operating within the proper voltage range or if the refrigeration system is experiencing excessive pressure. Voltage relay-3, 133 is connected so that upon the expiration of the time delay period the voltage must be within the predetermined range or a malfunction will be indicated. Furthermore the malfunction light will be energized by flashing relay-3, 131, when the engine start button is depressed so that the operator may determine if the malfunction light is operable.

From the above description it can be seen that there has been provided an electrical control circuit within a dual source combination motor-generator refrigeration unit having a protective circuit which prevents operation at improper voltage, and improper refrigerant pressure by discontinuing unit operation and indicating to an operator the presence of a malfunction.

The invention has been described in detail with particular reference to a preferred embodiment, thereof, but it will be understood that variations and modifications can be effected within the spirit and the scope of the invention.

What is claimed is:
1. In a refrigeration unit having an electrical power circuit, an electrical control circuit including temperature control means for selecting an appropriate mode of operation for the unit, an electrical protective circuit associated with the control circuit for protecting the internal components of the unit from damage due to malfunction which comprises:

relay means connected to the temperature control means for selectively energizing the power circuit;

voltage dependent means for energizing the relay means when the power circuit voltage is within a predetermined range;

a high pressure switch connected to the relay means for de-energizing the relay means when the pressure within the refrigeration system is not within a predetermined range; and time delay means connected to the relay means to allow the relay means to be energized for a predetermined time period during which the voltage dependent means may be bypassed.

2. The circuit as set forth in claim 1 wherein the relay means is a speed control solenoid associated with a motive source powering a generator whereby when the solenoid is energized the motive source will power the generator with sufficient speed to energize the power circuit.

3. The circuit as set forth in claim 1 wherein the relay means is a relay having contacts connecting the power circuit to an electric power source.

4. The circuit as set forth in claim 1 wherein the relay means, voltage dependent means and the high pressure switch are connected in series; and the time delay means comprises a time delay relay connected to the temperature control means in parallel with the relay means, the voltage delay means and the high pressure switch and having normally closed time delay-relay contacts connected to the temperature control means and the high pressure switch in parallel with the voltage dependent means whereby during the predetermined time delay period the contacts are held in the closed position to allow the relay means to be energized bypassing the voltage dependent means, and after the time period elapses, the contacts are opened requiring the current to flow through the voltage dependent means to continue to energize the relay means.

5. The circuit as set forth in claim 4 wherein the voltage dependent means comprises a voltage sensing relay connected across the power circuit and voltage relay contacts in the normally open position connected in parallel with the time delay-relay contacts between the temperature control means and the high pressure switch, whereby the contacts are closed only when the voltage in the power circuit is within a predetermined range.

6. The circuit as set forth in claim 5 and further including a clutch circuit comprising:

a second set of time delay-relay contacts in the normally open position connected to the temperature control means; and clutch means connected to the second time delay-relay contacts, said clutch means engaging the motive source to a compressor in the refrigeration system whereby the time delay period of the time delay-relay must elapse before the clutch will become engaged.

7. The circuit as set forth in claim 6 wherein the clutch circuit further comprises a second set of voltage relay contacts in the normally open position connected in series to the second set of time delay-relay contacts and the clutch means whereby the clutch means may be engaged only when the voltage in the power circuit is within the predetermined range.

8. The circuit as set forth in claim 7 wherein the clutch circuit further comprises a first set of auxiliary relay contacts in the normally closed position connected in series to the second set of time delay-relay contacts, the second set of voltage relay contacts and the clutch means whereby when the unit is in an auxiliary mode of operation an auxiliary relay opens the contacts disengaging the clutch to the compressor in the refrigeration system.

9. The circuit as set forth in claim 7 wherein the clutch circuit further comprises a malfunction indicating means and a third set of voltage relay contacts in the normally closed position connected in series to each other and to the second set of time delay-relay contacts whereby should the voltage across the power circuit fail to be within the predetermined range after the expiration of the time delay period a malfunction will be indicated.

10. A refrigeration unit with a compressor, an electric power circuit, an electric control circuit having temperature control means for selecting an appropriate mode of operation for the unit, mutually exclusive means for powering the compressor including an electric power source and a motive power source, the motive source being connected to a motor-generator which is used to generate electric power for the power circuit when the motive source is in operation and being used as a motor to power the compressor when the unit is connected to an electric power source, switching apparatus within the electric control circuit to alter the electric power circuit to conform to the appropriate power source and an electric protective circuit associated with control circuit for assuring the integrity of the components of the unit which comprises:

motive power source relay means connected with the switching apparatus and the temperature control means for energizing the power circuit;

electric power source relay means connected to the switching apparatus parallel to the motive power source relay means for energizing the power circuit, said switching apparatus being able to select either the electric power source or the motive power source for the unit;

voltage dependent means for energizing the switching apparatus when the power circuit voltage is within a predetermined range;

a high pressure switch connected with the switching apparatus for energizing the switching apparatus when the pressure within the refrigeration system is within a predetermined range; and time delay means connected in parallel with the voltage dependent means thereby allowing the relay means to be energized for a predetermined time period during which the voltage dependent means may be bypassed.

11. A method in a dual power source refrigeration unit for protecting the internal components of the unit from damage due to malfunction, the unit having an internal motive source for powering a motor-generator as a generator to provide electricity to a power circuit as one mode of operation, and an external source of electricity to provide electricity for the power circuit and for operating the motor-generator as a motor as a second mode of operation, and switching apparatus to select the appropriate mode of operation which comprises:

selecting the appropriate mode of operation;

de-energizing the appropriate power source when the power circuit voltage is not within a predetermined range; and delaying for a predetermined time period during startup of the unit the step of de-energizing when the voltage is not within the proper range.

12. The method as set forth in claim 11 and further including the step of:

interrupting the current to the appropriate power source when the refrigerant pressure within the refrigeration system is not within a predetermined range.

13. The method as set forth in claim 11 wherein the motor-generator is mechanically connected to a compressor in the refrigeration system which further comprises the step of:

disconnecting the motor-generator from the compressor after the expiration of the delaying period if the power circuit voltage is not within the predetermined range or if the unit is in an auxiliary mode of operation.

14. The method as set forth in claim 13 which further comprises:

indicating a malfunction if the voltage or the refrigerant system pressure is not within a predetermined range after the expiration of the delaying period.

* * * * *